United States Patent
Stewart et al.

(10) Patent No.: US 6,938,752 B2
(45) Date of Patent: Sep. 6, 2005

(54) BELT CONVEYOR SYSTEM WITH CARRIER PLATE

(75) Inventors: Brian G. Stewart, Beverly Hills, MI (US); John H. Jaynes, Commerce, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/212,711

(22) Filed: Aug. 7, 2002

(65) Prior Publication Data

US 2003/0047429 A1 Mar. 13, 2003

Related U.S. Application Data

(60) Provisional application No. 60/310,487, filed on Aug. 8, 2001.

(51) Int. Cl.⁷ .............................................. B65G 29/00
(52) U.S. Cl. .................................... 198/465.1; 29/33 P
(58) Field of Search ........................ 198/465.1–465.3, 198/779, 370.1, 817, 867.01, 867.13; 29/430, 33 P, 799, 281.4

(56) References Cited

U.S. PATENT DOCUMENTS

| | | | |
|---|---|---|---|
| 1,641,642 A | * | 9/1927 | Pangborn ..................... 198/779 |
| 1,800,898 A | | 4/1931 | Nelsen |
| 2,951,578 A | | 9/1960 | Hibbard |
| 3,261,448 A | | 7/1966 | Koesling |
| 3,370,727 A | | 2/1968 | Shaw |
| 3,550,756 A | * | 12/1970 | Kornylak ..................... 198/779 |
| 4,538,510 A | | 9/1985 | Latimer et al. |
| 4,765,122 A | | 8/1988 | Annas, Sr. et al. |
| 4,925,016 A | | 5/1990 | Lapeyre |
| 4,941,563 A | | 7/1990 | Fahrion |
| 4,974,724 A | | 12/1990 | Lapeyre |
| 4,989,723 A | | 2/1991 | Bode et al. |
| 5,012,917 A | | 5/1991 | Gilbert et al. |
| 5,013,203 A | | 5/1991 | Wakabayashi |
| 5,105,937 A | | 4/1992 | Gundlach |
| 5,127,336 A | | 7/1992 | Wakabayashi |
| 5,174,434 A | | 12/1992 | Bourgoine |
| 5,361,893 A | | 11/1994 | Lapeyre et al. |
| 5,377,819 A | | 1/1995 | Horton et al. |
| 5,507,383 A | | 4/1996 | Lapyere et al. |
| 5,626,447 A | | 5/1997 | Buysman et al. |
| 5,882,157 A | | 3/1999 | Buysman et al. |
| 6,095,322 A | | 8/2000 | Buysman et al. |
| 6,148,990 A | | 11/2000 | Lapeyre et al. |
| 6,170,634 B1 | | 1/2001 | Jaquet |
| 6,176,367 B1 | * | 1/2001 | Patrito ........................ 198/817 |
| 6,209,714 B1 | | 4/2001 | Lapeyre et al. |

FOREIGN PATENT DOCUMENTS

| | | |
|---|---|---|
| DE | 40 22 427 | 1/1992 |
| DE | 195 39 844 | 4/1997 |
| DE | 199 07 526 | 8/2000 |
| EP | 0 939 041 | 9/1999 |

OTHER PUBLICATIONS

Intralox Engineering Manual For Modular Plastic Conveyor Belts (2001).

* cited by examiner

*Primary Examiner*—Joseph Valenza
(74) *Attorney, Agent, or Firm*—Dickinson Wright PLLC

(57) ABSTRACT

The present invention is directed to a conveyor system for transporting a workpiece. The conveyor system includes a drive assembly and a carrier plate. The drive assembly includes a frame, a drive belt, and a drive mechanism supported by the frame and engaging the drive belt. The carrier plate is adapted to support a workpiece and is disposed on the drive belt to move with the drive belt.

15 Claims, 4 Drawing Sheets

*Figure - 1* - PRIOR ART

BELT CONVEYOR SYSTEM WITH CARRIER PLATE

CROSS-REFERENCE TO RELATED APPLICATION

This application claims the benefit of U.S. Provisional Application No. 60/310,487, filed Aug. 8, 2001, the entire disclosure of the application is considered part of the disclosure of this application and is hereby incorporated by reference.

BACKGROUND OF THE INVENTION

The present invention relates to a conveyor system and, more particularly, to a system that includes a workpiece carrier plate and a belt conveyor that transports the plate and workpiece.

Manufacturing facilities, particularly automobile assembly plants in Europe, have for some time used moving pallets or skillets to conveyor large parts such as vehicle bodies. The skillets are larger than the workpiece so as to permit a worker to ride the skillet along with the workpiece and to perform a production task as the skillet passes through a production area.

A representative prior art configuration of a plurality of skillets within a production area is shown in FIG. 1. The skillets 10, 12, and 14 are moved through the production area in a train such that adjacent skillets abut one another. The train is driven by friction drive assemblies which may include opposed drive mechanisms 18 and 20 located at the entrance to the production area. Each drive assembly has friction wheels that are positionable to engage the sides of the skillets and push the skillets forward in an end-to-end train through the production area. Retarding friction drives 24 maintain the abutting relationship of the skillets within the production area while acceleration drives 26 may be used to accelerate the skillets exiting the production area. Each skillet also includes wheels 28 that extend from the underside of its platform and ride on guide rails.

The skillet itself has robust construction that provides a sturdy platform for the workers, sufficient structural strength to accommodate the loadings, and a side surface depth that permits engagement by the friction drive wheels. To achieve the desired strength, skillets commonly include a robust steel frame and wood decking. While a robust design is generally necessary to accommodate the operational requirements of existing skillet systems, the strength comes at a cost, greater weight and expense. Moreover, the guide rails, friction drive assemblies, and other components of existing skillet systems are correspondingly robust, heavy, complex, and costly.

A further deficiency in the art with respect to friction driven skillet systems relates to maintaining the skillets in end-to-end abutting relationship throughout the production area. Specifically, despite the use of retarding drives, non-uniform movement of skillets within the train can create gaps between adjacent skillets. These gaps interrupt the continuity of the worker platform. The depth of existing skillets and the necessity for installation pits can create undesirably large elevation drops in the gaps.

SUMMARY OF THE INVENTION

With the above in mind, a need exists for a conveyor system that provides the benefits of existing skillet systems, particularly the continuous working platform that moves with the workpiece, while addressing the deficiencies in the prior art. The present invention is directed to a conveyor system that includes a drive assembly and a carrier plate. The drive assembly includes a frame, a drive belt, and a drive mechanism supported by the frame and engaging the drive belt. The carrier plate is adapted to support a workpiece and is disposed on the drive belt to move with the drive belt.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

A detailed description of an embodiment of the present invention will now be provided with reference to FIGS. 2–5. The illustrated embodiment shows an application of the invention wherein car bodies are transported through a production area through the use of a driven belt and carrier plates. Notwithstanding this specific illustration, it should be appreciated that the drive belt and carrier plate, as well as other features described and claimed herein, have wide spread application in the material handling industry. Further, from this description, drawings, and appended claims, various modifications within the general knowledge and ability of those skilled in the art will become apparent.

Figure 1:
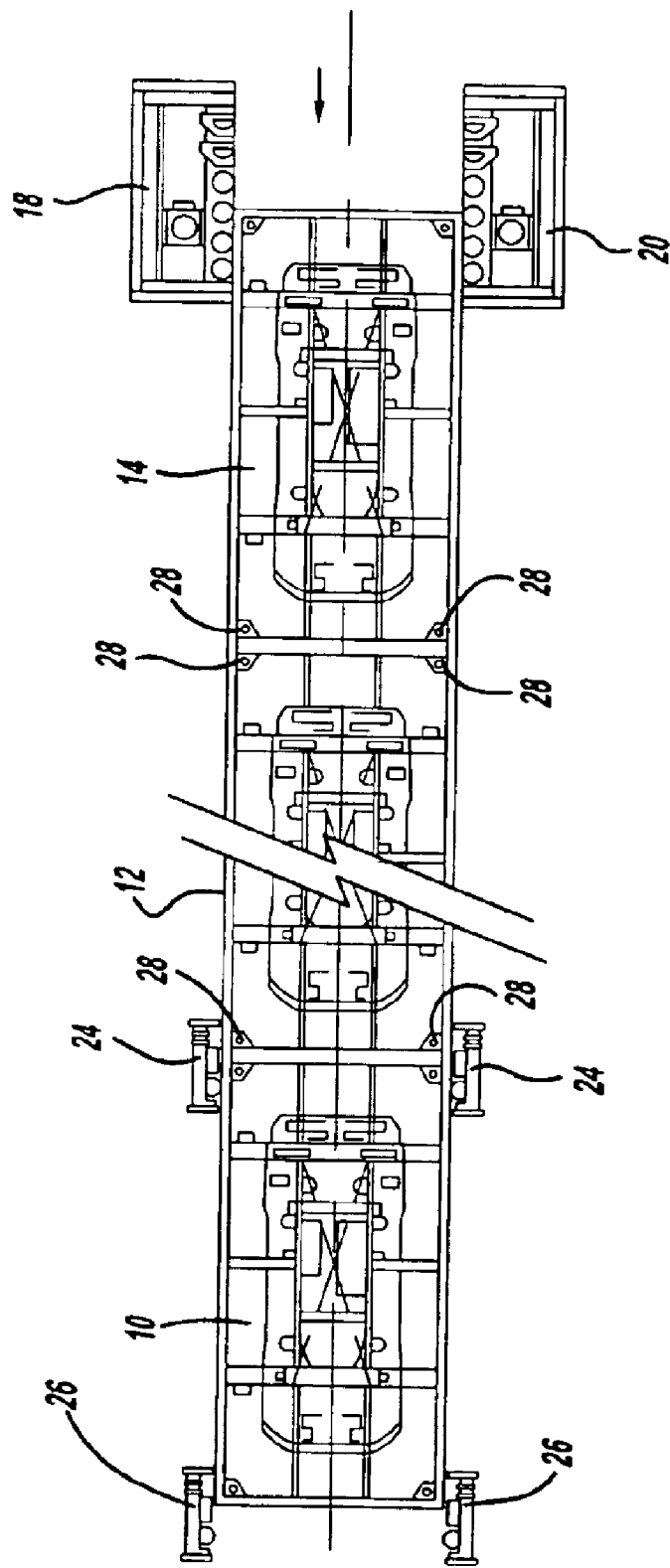
FIG. 1 is a top plan view of a prior art skillet system.
Figure 2:
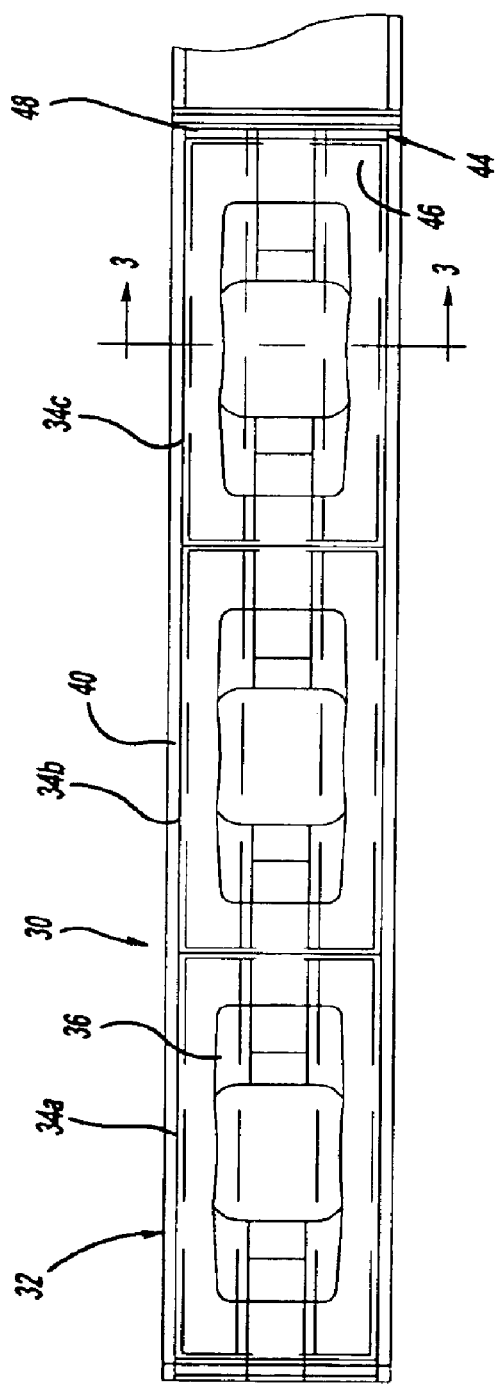
FIG. 2 is a top plan view of the conveyor system of the present invention.
Figure 4:
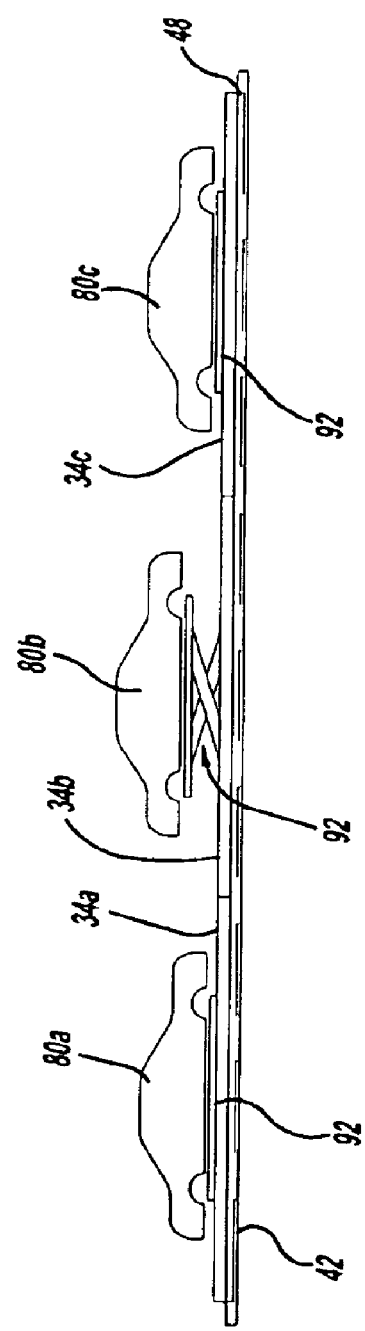
FIG. 4 is a side elevation view of the system illustrated in FIG. 2.
Figure 3:
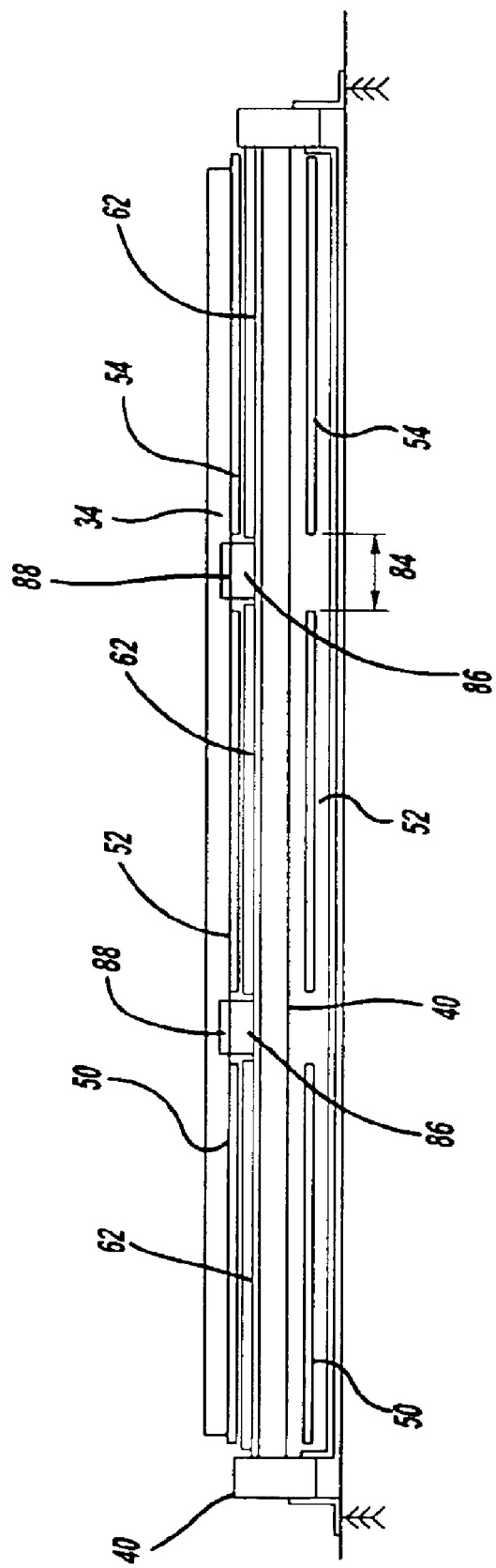
FIG. 3 is a section view taken along the line 3—3 shown in FIG. 2.

FIGS. 2–4 illustrate a conveyor system 30 including a drive assembly 32 and a plurality of carriers plates or platens 34. The conveyor system 30 is configured to transport workpieces through a production area while maintaining a substantially continuous working platform around and between the workpieces. The conveyor system is shown within an area where workers would commonly perform assembly tasks on the workpiece as it is moved by the drive assembly 32. Each workpiece 36 is fixed to one of the carrier plates 34 and the assemblies are delivered to and taken from the production area via any of a variety of transfer methods known in the art. A representative transfer method and structure is described below with reference to FIG. 5.

As is best illustrated in FIGS. 2 and 3, the drive assembly 32 includes a support frame 40, a drive belt 42, and a drive mechanism 44 coupled to the frame 40 and configured to drive the belt 42. It is desirable that the belt be formed of a solid composite and have a modular and hinged configuration such as the series 400 acetyl belt distributed by Intralox, Inc. of Harahan, La., a division of The Laitram Corporation. The drive assembly 32 also preferably includes a mechanical interlocking engagement between the drive mechanism 44 and the belt 42 such as through a sprocket and slot configuration. Examples of representative belt and drive configurations may be found in available literature, including U.S. Pat. Nos. 4,729,469 issued May 8, 1988 to Lapeyre; U.S. Pat. No. 4,821,872 issued Apr. 18, 1992 to Lapeyre; U.S. Pat. No. 4,925,016 issued May 15, 1990 to Lapeyre; U.S. Pat. No. 4,974,724 issued Dec. 4, 1990 to Lapeyre; U.S. Pat. No. 5,105,937 issued Apr. 21, 1992 to Gundlach; and U.S. Pat. No. 5,921,379 issued Jul. 13, 1999 to Horton, the disclosures of which are hereby incorporated by reference. Other belt, frame, and drive assembly configurations generally available in the art may also be used with the present invention without departing from the scope of the appended claims. Further, while a single drive assembly 32 is illustrated and described herein, it should be appreciated that the drive assembly may include a plurality of drive modules each with a separate moving belt loop. The carriers and corresponding workpieces may be transferred from drive module to drive module to provide production areas of extended length.

The drive mechanism 44 is illustrated in the appended drawings to include a drive motor 46 and a rotating drive shaft 48 having toothed sprockets that mechanically engage a slot in the belt or belts. The mechanical engagement, as opposed to frictional engagement commonly used by fabric conveyor belt drives, positively tracks the belt to the drive mechanism. The drive belt 42 illustrated in FIG. 3 has separate first, second, and third segments 50, 52, and 54, respectively (FIG. 3), each driven by the single sprocketed shaft 48 such that the belt segments are positively tracked and indexed to one another. The upper support surface defined by the three belt segments has a width that is preferably slightly narrower than a width of the support frame 40. Notwithstanding this representative illustration, those skilled in the art will appreciate that a variety of belt configurations may be used. For example, a single wide belt may be preferable in certain applications, particularly where a continuous transverse support surface from the belt is desirable.

The support frame 40 may have a variety of configurations designed to support the anticipated loads as well as provide a low friction support surface for all or each of the belt segments. As is generally known in the art, the support frame 40 may include an extruded aluminum structure covered on the upper bearing surface by an ultra-high molecular weight plastic sheet 62. The sheet may be fixed to the frame by conventional means, such as double-sided tape, mechanical fasteners, adhesives, and the like. The use of some manner of adhesive or double-sided tape provides the additional benefit of eliminating the use of mechanical fasteners that may adversely effect the smoothness of the slide surface. The frame and sheet support the modular plastic drive belt 42 in a manner that adequately distributes the loads to the frame while providing a low friction surface engaging the moving belt. This and similar frame arrangements provide an effective drive for the plates 34 while permitting the plates to have a less robust design than conventional skillets thereby decreasing the weight, cost, and complexity of the carrier plate design.

As is illustrated in the drawings and noted above, each workpiece is coupled to and moves with a carrier plate 34. Three adjacent carrier plates 34a, 34b, and 34c are illustrated in FIGS. 2 and 4 in abutting engagement to one another and supporting separate automobile bodies 80a, 80b, and 80c. Each automobile body or other workpiece may be coupled to its associated carrier plate prior to the production area entrance and transferred with the carrier through the production area. The carriers 34 are configured to provide the desired continuous work area around and between workpieces within the production area as well as being effectively and efficiently transported to and from different production areas. For example, it may be desirable to transport the carrier and workpiece assembly a greater distance than may be accommodated by a single drive belt and support frame. In these instances, multiple drive assemblies (such as the aforementioned drive modules) may be placed in series and the workpiece and carrier units being passed to subsequent drive modules. The carrier plates facilitate such transport by smoothly traversing the interface between adjacent drive units without the need for additional hardware.

As noted above, the carrier plates 34 preferably have a low profile and are light in weight relative to prior art skillets. The carrier plates 34 are preferably substantially rigid so as to permit the transfer of the carriers to and from the belts of each drive assembly as well as between transfer mechanisms and the drive belts while having a design and material characteristics that accommodate the loading of a particular application. Notwithstanding the variety of acceptable configurations and materials, it is contemplated that the carrier plate may include a frame, such as from aluminum as well as a continuous top member, such as wood, to provide the support surface for the workers about the workpiece. While the height or thickness of a carrier may vary depending on a specific application, it is commonly desirable to minimize the thickness of the carrier plate which may, in many instances, be approximately 1 inch or less. These low profile carrier plates are capable of supporting large and heavy workpieces such as the illustrated automobile bodies due, in part, to the distributed support provided by the underlying belt 42 and frame 40. As noted above, it should be appreciated that the carriers may be manufactured of a variety of materials depending on the desired performance characteristics.

The low profile of the carrier plate not only reduces the overall weight and cost of the carrier and the overall conveyor system, but it also provides other operational benefits. For example, adjacent carriers are preferably arranged in abutting engagement as shown in FIGS. 2 and 4. The frictional engagement between each carrier plate and the drive belt minimizes the opportunity for relative movement between the carriers and belt and therefore between adjacent carriers. Accordingly, the occurrence of gaps between the carriers is minimized. Should gaps occur, the low profile of the carrier and the substantially continuous transverse surface of the belt minimizes the vertical drop in the gaps. Thus, the present invention effectively maintains a substantially continuous worker platform throughout the production area. Additionally, unlike prior art skillet systems which provide structural support at discrete points, the continuous transverse support provided by the belt 42 enhances the stability of the system without requiring an unduly robust carrier plate design. The lighter weight and low profile of the carrier plate also facilitates the transfer of the plate and workpiece assembly to and from different belt segments and permits the use of a variety of transfer assemblies to feed the plates and workpieces to and from the drive assemblies.

Just as with conventional power systems, it may be desirable in certain applications to continuously or intermittently communicate power to the carrier plates. The power may be used in a variety of ways such as, for example, to power a scissor-lift 92 (FIG. 4) fixed to the carrier plate to support the workpiece and to raise and lower the workpiece to place it in the position that facilitates performance of the production task by the worker. To this end, as noted above, the drive belt 42 is illustrated in FIG. 3 to include three separate belt segments 50, 52, and 54. Adjacent segments are spaced from one another to define a gap 84 therebetween. A conductor bar 86 may be coupled to the frame 40 to function as a direct current bus. The bar 86 is positioned within the gap 84 and vertically proximate the upper surface of each drive belt segment. Contacts or brushes 88 may be positioned along the bottom surface of the carrier plate 34 to contact the conductor bar 86 at predetermined locations along the length of the frame to provide power from an external source through the conductor bar 86 and to the carrier plate 34. A plurality of conductor bars 86 may be strategically placed longitudinally along the gap to selectively power the lift or other carrier plate accessory.

Figure 5:
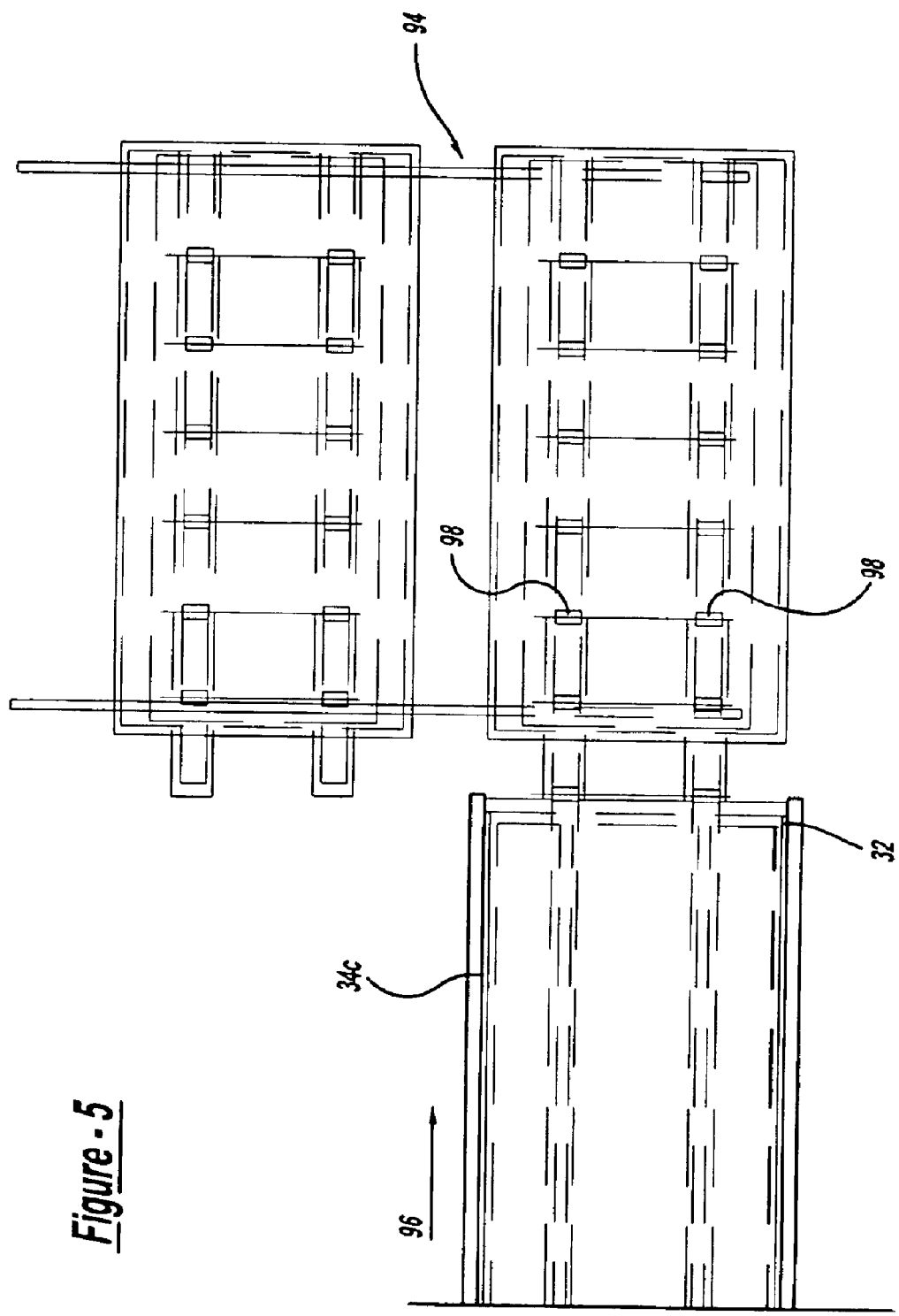
FIG. 5 is a top plan view of a representative exit configuration for the conveyor system.

As noted above, the assembly formed by the workpiece and carrier are preferably passed to and from the drive belt as a unit. A representative transfer arrangement is illustrated in FIG. 5 to include a transfer drive belt 94 similar to the drive belt 32 described above and oriented perpendicular thereto. The movement of the transfer drive belt 94 is preferably indexed by a controller and sensor assembly to the movement of the exiting workpiece and carrier plate so that the plate and workpiece assembly is not moved in the exit direction indicated by arrow 96 until the assembly has been moved completely out of engagement with the production area drive belt 32. The transfer drive belt 94 includes a plurality of rollers 98 on its support surface to rollingly support the carrier and workpiece assembly and permit movement thereof onto the drive belt. A representative rollered drive belt is described in U.S. Pat. No. 6,148,990 issued Nov. 21, 2000 to Lapeyre et al., the disclosure of which is hereby incorporated by reference. Those skilled in the art will appreciate that a similar transfer mechanism may be used to feed carriers and workpieces onto a drive assembly such as through the use of a mechanical pusher or other arrangement. While a representative transfer arrangement has been described herein, those skilled in the art will appreciate that a variety of alternative embodiments may be used without departing from the scope of the present invention.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveyor system for transporting a workpiece, said conveyor system comprising:
   a drive assembly including a frame having a top surface, at least one drive belt disposed partially on said top surface, and a drive mechanism supported by the frame and engaging said at least one drive belt to displace said at least one drive belt in a longitudinal direction relative to the frame;
   a carrier plate having a surface area larger than a surface area of said workpiece to provide a worker platform around at least a portion of said workpiece; and
   said carrier plate disposed on said at least one drive belt to move with said at least one drive belt wherein said at least one drive belt provides substantially continuous transverse support for said carrier plate at least in the area of said worker platform to minimize the weight of said carrier plate and provide distributed support to said carrier plates.

2. The conveyor system of claim 1 wherein said drive mechanism is a drive shaft rotatable relative to the frame and mechanically interlocked with said at least one drive belt such that the rotating shaft displaces said at least one drive belt in a longitudinal direction relative to the frame.

3. The conveyor system of claim 2 wherein said conveyor system further comprises a conductor fixed to said frame.

4. The conveyor system of claim 3 wherein said carrier plate has a contact positioned to operably engage said conductor.

5. The conveyor system of claim 4 wherein said conductor is positioned to engage said contact at a predetermined longitudinal position.

6. The conveyor system of claim 5 wherein said system further includes a plurality of conductors positioned in said gap to engage said contact when said plate is at predetermined longitudinal positions along said frame.

7. A conveyor system for transporting workpieces through a production area comprising:
   a drive assembly including a frame, at least one drive belt, and a drive mechanism supported by the frame and engaging said at least one drive belt to displace said at least one drive belt in a longitudinal direction relative to the frame and wherein said frame provides substantially continuous support for said at least one drive belt; and
   a plurality of carrier plates each having a surface area larger than a surface area of said workpiece to provide a worker platform around at least a portion of said workpiece; and
   said plurality of carrier plates disposed on said at least one drive belt wherein said at least one drive belt provides substantially continuous transverse support for each of said carrier plates at least in the area of said worker platform to minimize the weight of each of said carrier plates and provide distributed support to each of said carrier plates.

8. The conveyor system of claim 7 wherein said drive assembly includes a plurality of drive modules each with said at least one drive belt, the drive belts being arranged in series to transport the plurality of carrier plates through the production area.

9. The conveyor system of claim 7 further including a transfer belt with rollers coupled to the transfer belt, said rollers oriented to rotate in line with the drive belt of the drive assembly to feed carrier plates to or receive carrier plates from the drive assembly.

10. The conveyor system of claim 1 wherein said carrier plate including first and second lateral sides and a support surface extending between said first and second lateral sides, said belt providing substantially continuous transverse support for said support surface.

11. The conveyor system of claim 7 wherein said drive belt and said top surface provide a stable surface to said carrier plates to minimize relative movement between adjoining carrier plates.

12. The conveyor system of claim 1 wherein said carrier plate includes a base having a thickness of approximately less than or equal to one inch.

13. The conveyor system of claim 7 wherein said carrier plate includes a base having a thickness of approximately less than or equal to one inch.

14. The conveyor system of claim 1 wherein said carrier plates are in substantially abutting relationship with one another.

15. The conveyor system of claim 7 wherein said carrier plates are in substantially abutting relationship with one another.

* * * * *